April 9, 1963 G. D. FULLERTON 3,084,423
BEARING SEAL INSTALLER TOOL
Filed May 4, 1959

INVENTOR
Gail D. Fullerton

BY Mason, Fenwick & Lawrence
ATTORNEYS

United States Patent Office 3,084,423
Patented Apr. 9, 1963

3,084,423
BEARING SEAL INSTALLER TOOL
Gail D. Fullerton, R.R. 2, Box 288, Fillmore, Calif.
Filed May 4, 1959, Ser. No. 810,924
1 Claim. (Cl. 29—235)

This invention relates to tools, and more particularly to a tool for installing the rear main upper seal in the crank shaft of an automobile engine.

To replace the upper half of the rear main bearing oil seal for the crank shaft of an automobile engine it is necessary to remove the engine from the chassis and remove the crank shaft from the engine. This is the standard procedure set forth in the shop manuals issued by manufacturers of automobiles.

The procedure outlined above results in a labor service operation which is time consuming and expensive, and requires the facilities of a well equipped garage.

Consequently, it is an object of the present invention to provide a tool making it unnecessary to remove the engine or the crank shaft.

It is a further object of the present invention to provide such a tool which can be attached to the tapped motor block by the simple means of a bolt.

Other objects and advantages of the present invention will become apparent from the following description when read in conjunction with the accompanying drawing, wherein.

Figure 1:
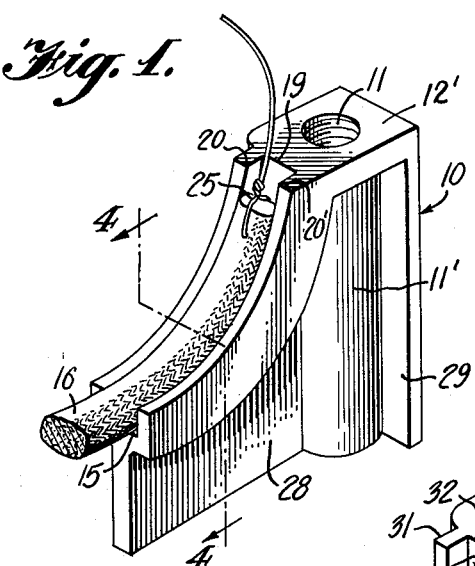
FIGURE 1 is a perspective view of the tool of the present invention showing the wick seal in place in the channel of the tool, for attachment to the motor block of the automobile.
Figure 2:
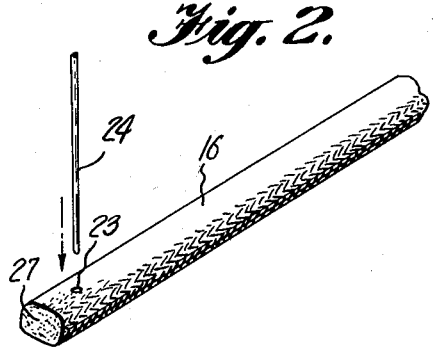
FIGURE 2 is a partial perspective view of the wick seal which has been pierced to receive a draw wire.
Figure 3:
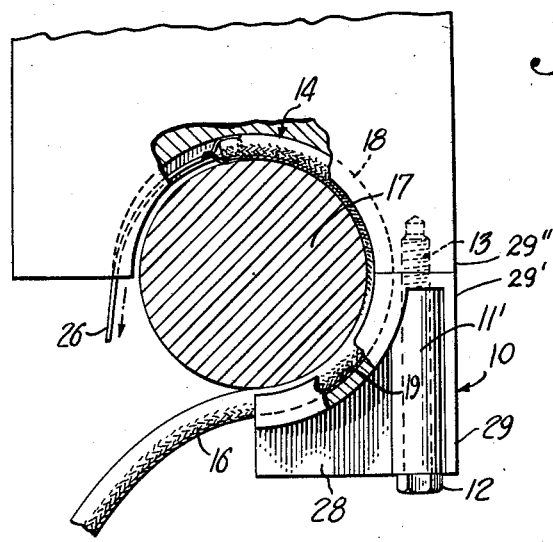
FIGURE 3 is a vertical sectional view through the motor block, with the tool of the present invention bolted in place and showing the wick seal being drawn into the upper portion of the bearing.

Adverting now to the drawing, and more particularly to FIGURES 1 and 3, there is shown at 10 the bearing seal installation tool of the present invention for use in installing the upper half of the wick seal of the rear main bearing of an automobile engine. A bore 11 through the top flat abutting surface 12' of the pillar portion 11' of the tool 10 is provided to receive a bolt 12. The bolt 12 is of a size to match the existing threaded tapping 13 in the block of the engine M, which receives the bolt that attaches the motor bearing cap (not shown). The tool 10 is mounted on the motor block adjacent the crankshaft bearing 14 of the engine by inserting the bolt 12 through the bore 11 and tightening it in the threaded tapping 13. An arcuate channel 15 is provided on the tool to receive the wick seal 16. The curvature of the channel 15 is substantially complementary to the circumference of the crank shaft 17, so that when the tool 10 is bolted to the motor block M it forms an extension of the bearing seal slot 18 of the motor block M.

The size and position of the bore 11 with respect to the channel 15 of the tool will vary for different types of engines, and also the size and curvature of the channel 15 will vary according to the size of the bearing slot 18 and size of the crank shaft 17 for different types of engines. A bearing seal installer tool 10 for installing the seal in a Ford engine would have a slightly different arrangement of the channel 15 with respect to the bore 11, than the bearing seal installer tool for a Chevrolet, due to the difference in tapping the motor block in the respective motors. In the fabrication of the tool, however, it is important that when the tool is installed on the motor block, the base 19 of the tool channel and the side flanges 20 and 20' will be in virtual alignment with the corresponding base 21 and side walls 22, 22' of the bearing seal slot 18.

The bearing seal to be replaced is removed by using a punch to drive one side of the seal inwardly until about a half an inch at the other side of the crank shaft protrudes from the motor block. A pair of pliers may then be used to pull the old seal from the bearing. A new seal 16 is then punched to provide an aperture 23, and a length of draw wire 24 is inserted through the aperture 23 to provide an attachment loop 25. The seal 16 with the wire 24 attached is then placed in the channel 15 of the bearing seal installer tool of the present invention. The tool 10 is then fastened to the motor block M by means of the cap bolt 12, after the wire 24 has been inserted through the bearing slot 18 with an end 26 protruding from the opposite side of the slot 18. By pulling the end 26 of the wire 24, the seal is easily pulled into the bearing seal slot 18. After the seal is pulled into the bearing slot, the ends are evenly cut off. The installation of the upper rear main bearing seal is then completed.

The channel 15 has been shown as being of considerable arcuate length. This extended length, however, is not essential, the essential length being the distance from the end of the seal to a point adjacent the aperture 23. The seal 16 cannot be installed in the slot 18 simply by threading the wire through the slot 18 and attempting to pull the seal through the channel without the use of the tool 10. Under such circumstances the end of the seal would fray, and it could not be pulled into the slot 18. Even if the end 27 could be carefully tucked into the slot 18, force exerted on the wire 24 would cause expansion of the seal between the end 27 and the aperture 23, and this would prevent moving the seal into the channel.

The function of the present tool is to provide an extension of the slot 18 in which the seal may be placed before the extension is fastened in alignment with the slot 18. The channel 15 of the present tool provides this extension of the bearing slot 18.

A web 28 provides a support for the channel 15 and a finger grasp for holding the tool in postion while it is being tightened. The web 29 provides a plane 29' surface which is useful in aligning the channel 15 in a transverse direction across the crank shaft, to ensure alignment of the channel 15 and slot 18.

As stated, the important alignments are the bottom 19 of the channel 15 with the bottom 21 of the slot 18, and the alignment of the flanges 20, 20' of the channel 15 with the sides 22, 22' of the slot 18, this alignment being such that there will be no shoulders to fray the seal nor reduction in the channel of the tool to compress the seal. This alignment is assured by the alignment of plane surface 29' on the tool with the alignment edge 29" on the motor block.

Figure 6:
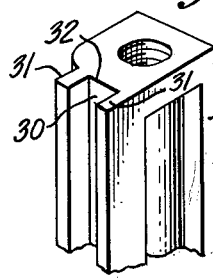
FIGURE 6 is partial perspective view of a modified form of the tool for attachment to the motor block of the automobile.
Figure 5:
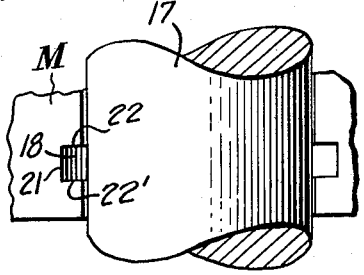
FIGURE 5 is a partial bottom view of the motor block showing the crank shaft seated in the upper half of the rear bearing and the slot for the bearing seal.

In FIGURE 6 there is shown a modified form of the invention, in which the tool is provided with a vertically extending channel 30, having the flanges 31, 31' aligned with the slots 22, 22' and the base 32 aligned with the base 21 of the slot 18. In this modification of the tool, the web 29 provides the principal means for aligning the tool transversely of the crank shaft.

Figure 4:
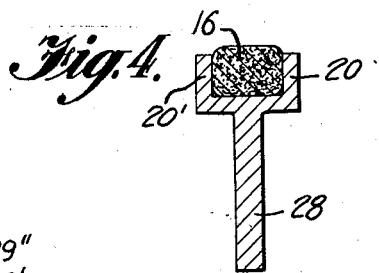
FIGURE 4 is a vertical cross-sectional view through the tool of the present invention, taken on the line 4—4 of FIGURE 1.

In the tool shown in FIGURES 1 and 4, it will be noted that the seal is somewhat larger than the slot 18, in which it is to be installed. In this form of the tool, the tightening of the tool to the motor block initially compresses the seal.

In the modified form of the tool shown in FIGURE 6 the curvature of the crank shaft progressively compresses the seal as it is moved into the slot 18.

While there has been disclosed in the foregoing description a practical embodiment of the bearing seal installer tool in accordance with the present invention, it will be understood by those skilled in the art that variations in the implementation of the concept of the invention are within the purview and scope of the invention.

What is claimed is:

In a tool for use in installing a wick seal in the upper seal receiving slot adjacent the rear crankshaft main bearing of an automobile motor block after the retaining bolts of the bearing cap are removed from their tapped holes in the motor block to expose the crankshaft, the tool having a vertically disposed tool body, a pillar portion on the tool body vertically apertured to receive an attachment bolt to engage one of the tapped holes of the motor block for coupling the tool to the motor block, the improvement comprising in combination, a flat surface on the pillar portion abutting the motor block, an arcuately extending channel terminating at an edge in the flat surface, said channel having a substantially identical cross-section as said slot throughout the length of said channel and forming an extension on a substantially identical arc as said slot of said motor block when the tool is coupled in place on the motor block, and a web substantially parallel to the axis of said aperture, said web having a plane surface perpendicular to said flat surface and spaced from said edge a distance equal to the distance between said slot and an aligning edge on said motor block to provide an alignment means to assure proper positioning of the tool transversely of said crankshaft.

References Cited in the file of this patent
UNITED STATES PATENTS 2,261,398   Simmons _____ Dec. 16, 1952